(12) United States Patent
Yang et al.

(10) Patent No.: US 9,717,109 B2
(45) Date of Patent: Jul. 25, 2017

(54) WIRELESS PROXIMITY PASSWORD PAIRING OF USER-INTERFACE DEVICES

(71) Applicant: Apple Inc., Cupertino, CA (US)

(72) Inventors: Xi Yang, Saratoga, CA (US); Hsin-Yuo Liu, Fremont, CA (US); Indranil S. Sen, Fremont, CA (US); Vusthla Sunil Reddy, San Jose, CA (US); Peter M. Agboh, San Francisco, CA (US); Mohit Narang, San Jose, CA (US); Ruben Caballero, San Jose, CA (US); Qiyang Wu, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/170,586

(22) Filed: Jun. 1, 2016

(65) Prior Publication Data

US 2016/0278156 A1     Sep. 22, 2016

Related U.S. Application Data

(63) Continuation of application No. 14/502,357, filed on Sep. 30, 2014, now Pat. No. 9,392,398.

(51) Int. Cl.
*H04W 76/02*     (2009.01)
*H04W 4/00*      (2009.01)
(Continued)

(52) U.S. Cl.
CPC ........ *H04W 76/023* (2013.01); *H04B 17/318* (2015.01); *H04W 4/008* (2013.01);
(Continued)

(58) Field of Classification Search
CPC .................................................. H04W 76/023
See application file for complete search history.

(56) References Cited

U.S. PATENT DOCUMENTS

| 9,392,398 B2 | 7/2016 | Yang et al. |
| 2011/0016405 A1* | 1/2011 | Grob .................. H04N 1/00127 715/740 |

(Continued)

FOREIGN PATENT DOCUMENTS

EP     2 355 563 A1     8/2011

OTHER PUBLICATIONS

Extended European Search Report, for European Patent Appl. No. 15184646.6, 12 pages, dated Jun. 15, 2016.
(Continued)

*Primary Examiner* — Tuan H Nguyen
(74) *Attorney, Agent, or Firm* — Sterne, Kessler, Goldstein & Fox P.L.L.C.

(57) ABSTRACT

To establish a connection between electronic devices some embodiments include a system, method, and/or computer program product for password pairing user-interface devices in wireless proximity. A first electronic device (e.g., a keyboard) transmits an advertising packet, and receives a password, where the password has been generated by a second electronic device (e.g., a smartphone) and the password enables pairing between the first electronic device and the second electronic device. The first electronic device transmits a message including the password to the second electronic device, where the second electronic device is within a predefined range of the first electronic device. In some embodiments the first device receives a command from the second electronic device to transition to a discovery mode, transitions to the discovery mode, and transmits a confirmation to the second electronic device that the first device is in the discovery mode.

20 Claims, 7 Drawing Sheets

(51) Int. Cl.
*H04W 8/00* (2009.01)
*H04W 12/06* (2009.01)
*H04B 17/318* (2015.01)
*H04W 84/04* (2009.01)
*H04W 84/12* (2009.01)

(52) U.S. Cl.
CPC .......... *H04W 8/005* (2013.01); *H04W 12/06* (2013.01); *H04W 84/042* (2013.01); *H04W 84/12* (2013.01)

(56) References Cited

U.S. PATENT DOCUMENTS

| | | |
|---|---|---|
| 2011/0210830 A1 | 9/2011 | Talty et al. |
| 2013/0189925 A1 | 7/2013 | Staskawicz et al. |
| 2014/0232903 A1* | 8/2014 | Oshima ............... H04N 5/3532 348/229.1 |
| 2014/0256260 A1 | 9/2014 | Ueda et al. |
| 2014/0357293 A1 | 12/2014 | Tsaur et al. |
| 2014/0362728 A1 | 12/2014 | Krochmal et al. |
| 2014/0370879 A1* | 12/2014 | Redding ............... H04W 4/001 455/419 |
| 2015/0026580 A1* | 1/2015 | Kang ..................... G06F 3/167 715/728 |
| 2016/0094934 A1 | 3/2016 | Yang et al. |

OTHER PUBLICATIONS

Partial European Search Report for European Patent Application No. 15184646.6, 7 pages, dated Feb. 23, 2016.

\* cited by examiner

WIRELESS PROXIMITY PASSWORD PAIRING OF USER-INTERFACE DEVICES

CROSS-REFERENCE TO RELATED APPLICATIONS

This application is a continuation of allowed U.S. application Ser. No. 14/502,357, filed Sep. 30, 2014, entitled "Wireless Proximity Pairing of User-Interface Devices" which is incorporated herein by reference in its entirety.

BACKGROUND

Field

The described embodiments relate to techniques for wirelessly pairing user-interface devices.

Related Art

Many modern electronic devices include a networking subsystem that is used to wirelessly communicate with other electronic devices. For example, these electronic devices can include a networking subsystem with a cellular network interface (UMTS, LTE, etc.), a wireless local area network interface (e.g., a wireless network such as described in the Institute of Electrical and Electronics Engineers (IEEE) 802.11 standard or Bluetooth® from the Bluetooth Special Interest Group of Kirkland, Wash.), and/or another type of wireless interface.

Many of these communication protocols require electronic devices to establish a connection (which is sometimes referred to as 'pairing' or 'association'). However, it is often difficult to pair electronic devices. For example, in order to pair two electronic devices using Bluetooth, a user may need to initiate the pairing through a complicated user interface. Because the user interface can be difficult for users to use, the pairing procedure often degrades the user experience.

SUMMARY

The described embodiments relate to an electronic device that facilitates wireless proximity pairing. This electronic device includes: an antenna; and an interface circuit, coupled to the antenna, which communicates with at least another electronic device. During operation, the interface circuit: receives an advertising packet from the other electronic device; compares a performance metric associated with the communication with the other electronic device with a threshold value; and provides pairing-intent information specifying a pairing intent for the electronic device and the other electronic device for presentation by the other electronic device based on the comparison. Moreover, the interface circuit: receives additional pairing-intent information specifying the pairing intent from the other electronic device; and establishes a connection with the other electronic device when the additional pairing-intent information matches the pairing-intent information.

Furthermore, establishing the connection may involve: providing a command to the other electronic device to transition to a discovery mode when the additional pairing-intent information matches the pairing-intent information; receiving confirmation from the other electronic device that the other electronic device is in the discovery mode; and establishing the connection.

In some embodiments, prior to establishing the connection, the interface circuit compares the pairing-intent information and the additional pairing-intent information.

Note that the performance metric may include a received signal strength indicator. Moreover, the pairing intent may include: a gesture; and/or a sequence of one or more characters. Furthermore, the additional pairing-intent information may include: the sequence of one or more characters; accelerometer data corresponding to the gesture; and/or user-interface data corresponding to the gesture.

Additionally, the interface circuit may: determine that a set of one or more additional electronic devices is waiting to connect with the other electronic device; share that the electronic device is waiting to connect with the other electronic device with the set of one or more additional electronic devices; provide the performance metric to the set of one or more additional electronic devices; and receive performance metrics from the set of one or more additional electronic devices.

In some embodiments, the interface circuit: receives advertising packets from a set of one or more additional electronic devices; compares performance metrics associated with the communication with the set of one or more additional electronic devices with the threshold value; identifies at least a subset of the set of one or more additional electronic devices based on the comparisons; and repeats the providing of the pairing-intent information, the receiving of the additional pairing-intent information, and the establishing of the connection for the set of one or more additional electronic devices.

Another embodiment provides an electronic device that includes: an antenna; an interface circuit, coupled to the antenna, which communicates with at least another electronic device; a processor; and memory that stores a program module. This program module may be executed by the processor to establish a connection. In particular, the program module may include instructions for at least some of the previously described operations performed by the interface circuit.

Another embodiment provides a method for establishing the connection between the electronic device and the other electronic device. During operation, the electronic device receives the advertising packet from the other electronic device. Then, the electronic device compares the performance metric associated with communication with the other electronic device with the threshold value. Moreover, the electronic device provides pairing-intent information specifying the pairing intent for the electronic device and the other electronic device to the user of the other electronic device based on the comparison. For example, the other electronic device may present the pairing-intent information. Alternatively, the electronic device may display the pairing-intent information. Next, the electronic device receives the additional pairing-intent information specifying the pairing intent from the other electronic device. Furthermore, the electronic device establishes the connection with the other electronic device when the additional pairing-intent information matches the pairing-intent information.

Some embodiments include system(s), method(s), and/or computer program product(s) for password pairing user-interface devices in wireless proximity, where a first electronic device (such as but not limited to a keyboard) transmits an advertising packet, and receives a password, where the password has been generated by a second electronic device (such as but not limited to a smartphone) and the password enables pairing between the first electronic device and the second electronic device. The first electronic device transmits a message including the password to the second electronic device, where the second electronic device is within a predefined range of the first electronic device. In some embodiments the first device receives a command from the second electronic device to transition to a discovery mode, transitions to the discovery mode, and transmits a confirmation to the second electronic device that the first device is in the discovery mode.

This Summary is provided merely for purposes of reviewing some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS/FIGURES

Note that like reference numerals refer to corresponding parts throughout the drawings. Moreover, multiple instances of the same part are designated by a common prefix separated from an instance number by a dash.

DETAILED DESCRIPTION OF THE INVENTION

In order to establish a connection between electronic devices, after receiving an advertising packet from another electronic device, an electronic device compares a performance metric associated with the communication (such as the received signal strength indicator) with the other electronic device with a threshold value. Based on the comparison, the electronic device provides pairing-intent information specifying a pairing intent for the electronic device and the other electronic device to a user of the other electronic device. For example, the other electronic device may present the pairing-intent information. Alternatively, the electronic device may display the pairing-intent information. Moreover, after receiving additional pairing-intent information specifying the pairing intent from the other electronic device, the electronic device establishes the connection with the other electronic device when the additional pairing-intent information matches the pairing-intent information.

For example, the pairing intent may include a gesture and/or a sequence of one or more characters, and the additional pairing-intent information may include: the sequence of one or more characters; accelerometer data corresponding to the gesture; and/or user-interface data corresponding to the gesture. Thus, gestures and/or sequences of one or more characters may be used to clarify the pairing intent for the electronic device and the other electronic device, which may simplify the procedure for pairing the electronic device and the other electronic device and, thus, may improve the user experience.

While a wide variety of communication protocols may be used in conjunction with this communication technique (such as a communication protocol compatible with an Institute of Electrical and Electronics Engineers or IEEE 802.11 standard, or another type of wireless interface), in the discussion that follows Bluetooth® Low Energy or BTLE (from the Bluetooth Special Interest Group of Kirkland, Wash.) is used as an illustrative example.

Figure 1:
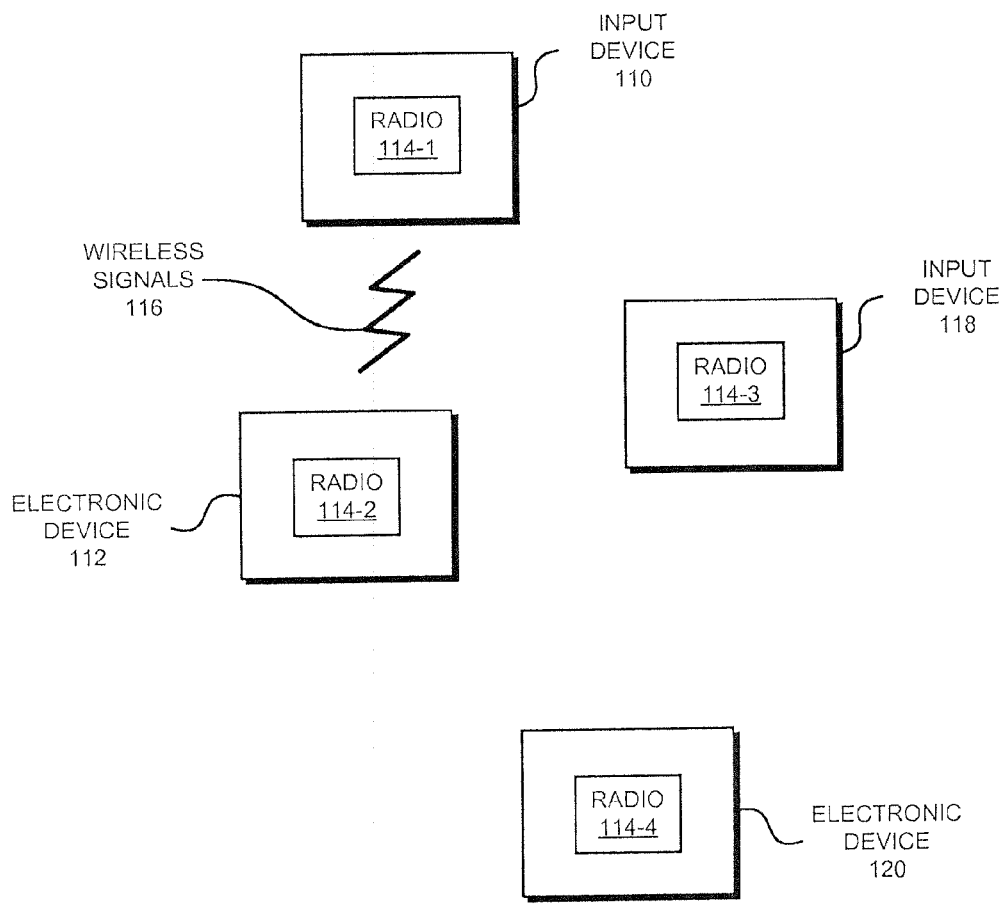
FIG. 1 is a block diagram illustrating electronic devices wirelessly communicating in accordance with an embodiment of the present disclosure.

The communication between the electronic devices is shown in FIG. 1, which presents a block diagram illustrating input device 110 and electronic device 112 wirelessly communicating. In particular, these electronic devices may wirelessly communicate while: detecting one another by scanning wireless channels, transmitting and receiving advertisements (which are sometimes referred to as 'advertising frames' or 'advertising packets') on wireless channels, establishing connections (for example, by transmitting connect or association requests), and/or transmitting and receiving packets (which may include the request and/or additional pairing-intent information as payloads).

Figure 7:
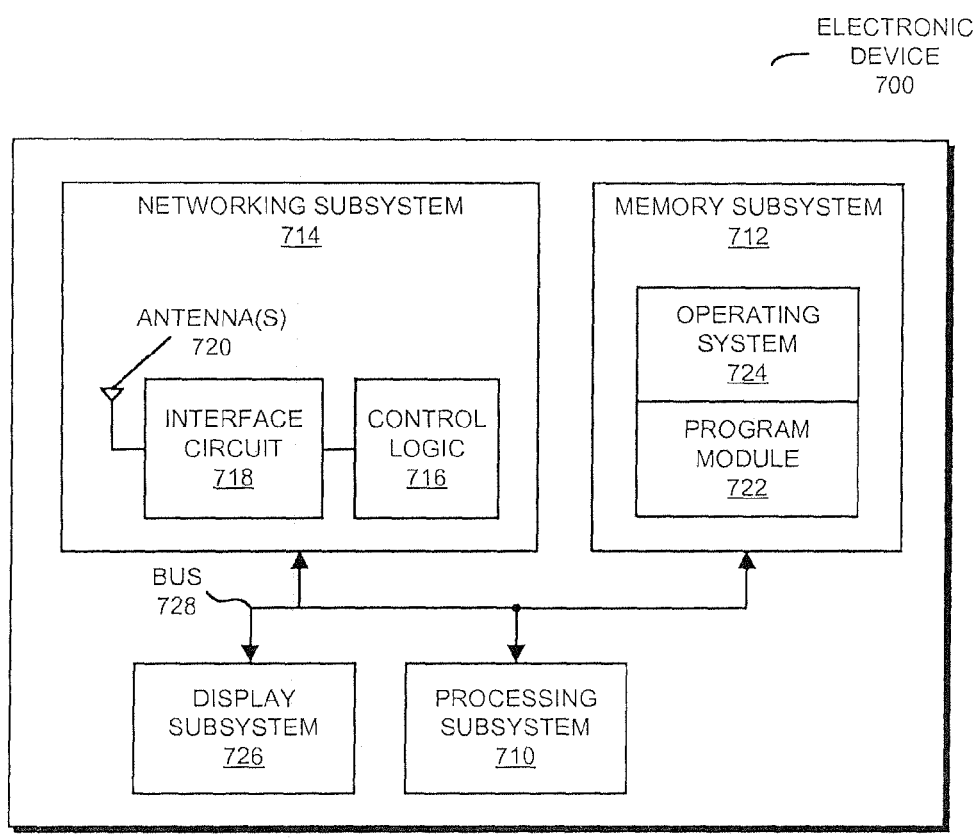
FIG. 7 is a block diagram illustrating one of the electronic devices of FIG. 1 in accordance with an embodiment of the present disclosure.

As described further below with reference to FIG. 7, input device 110 and electronic device 112 may include subsystems, such as a networking subsystem, a memory subsystem and a processor subsystem. In addition, input device 110 and electronic device 112 may include radios 114 in the networking subsystems. More generally, input device 110 and electronic device 112 can include (or can be included within) any electronic devices with the networking subsystems that enable input device 110 and electronic device 112 to wirelessly communicate with another electronic device. This can comprise transmitting advertisements on wireless channels to enable electronic devices to make initial contact with or detect each other, followed by exchanging subsequent data/management frames (such as connect or association requests) to establish a connection, configure security options (e.g., IPSec), transmit and receive packets or frames via the connection, etc.

As can be seen in FIG. 1, wireless signals 116 (represented by a jagged line) are transmitted from a radio 114-1 in input device 110. These wireless signals 116 are received by radio 114-2 in electronic device 112. In particular, input device 110 (such as a peripheral or a user-interface device, e.g., a keyboard or a trackpad) may broadcast or transmit advertisements. In turn, electronic device 112 (such as a smartphone or a laptop computer) may receive one or more advertisements, thereby detecting the presence of input device 110. This may allow input device 110 and electronic device 112 to optionally establish a connection and communicate with each other.

However, it can be difficult to establish a desired connection between input device 110 and electronic device 112. Suppose, for example, users of input device 110 and electronic device 112 want to associate input device 110 and electronic device 112 to establish a BTLE connection. If input device 110 and electronic device 112 are the only devices in proximity, then when electronic device 112 detects the presence of input device 110 (based on one or more received advertisements), electronic device 112 can establish the BTLE connection with input device 110 by exchanging connection information (including encryption keys) with input device 110.

When there are additional input devices in proximity (such as input device 118), the procedure may be more complicated, because electronic device 112 may detect input devices 110 and 118 and may not know with which one the user of electronic device 112 wants to establish the BTLE connection. Alternatively, there may be another host (such as electronic device 120) that also wants to pair with input device 110 (e.g., electronic device 112 may detect that electronic device 120 is waiting to pair with input device 110).

As described further below with reference to FIGS. 2-6, these problems may be addressed using the communication technique. As an illustration, suppose users of input device 110 and electronic device 112 want to establish a BTLE connection. After electronic device 112 detects an advertisement from input device 110, electronic device 112 may confirm that input device 110 is in proximity to electronic device 112 by comparing a performance metric associated with the communication between input device 110 and electronic device 112 to a threshold value. In particular, a received signal strength indicator (RSSI) may be compared to the threshold value (such as −50 to −60 dBm). (Note, however, that RSSI is used as an illustration, and that a wide variety of performance metrics may be used, such as: a mean-square error relative to a target pattern, a bit error rate, a packet error rate, a signal-to-noise ratio, etc.) If the RSSI exceeds the threshold value, electronic device 112 may provide pairing-intent information specifying a pairing intent for input device 110 and electronic device 112. For example, electronic device 112 may display pairing-intent information specifying a gesture and/or a sequence of one or more characters. (Alternatively, electronic device 112 may communicate the pairing-intent information to input device 110, which may present the pairing-intent information to a user of input device 110.)

In response, the user of input device 110 may perform the gesture and/or the sequence of one or more characters. This may involve using a touch-sensitive display (or 'touchscreen') to 'write' the gesture or the character. Alternatively, the user of input device 110 may perform a two- or three-dimensional gesture in space while holding input device 110 in their hand. One or more sensors in input device 110 (such as an orientation sensor or an accelerometer) may capture measurements associated with the gesture. Similarly, the user of input device 110 may enter the sequence of one or more characters using another user-interface device, such as a keyboard or via speakers using a voice-recognition technique.

Then, input device 110 may communicate additional pairing-intent information (such as an output from the touch-sensitive display, user-interface data, the measurements from the one or more sensors, e.g., accelerometer data, the signature characteristics of a gesture, etc.) specifying the pairing intent to electronic device 112. For example, the additional pairing-intent information may be communicated between input device 110 and electronic device 112 via wireless communication. Next, electronic device 112 may establish the BTLE connection with input device 110 if the additional pairing-intent information matches the pairing-intent information. This may involve providing a command or an instruction to input device 110 to transition to a discovery mode. After receiving confirmation that input device 110 has transitioned to the discovery mode, input device 110 and electronic device 112 may establish the BTLE connection.

In some embodiments, when electronic device 112 receives advertisements from a set of one or more input devices (such as input devices 110 and 118), input device 110 may compare performance metrics associated with the communication with input devices 110 and 118 with the threshold value. Based on the comparisons, electronic device 112 identifies at least a subset of the set of electronic devices. For example, RSSI values for the communication with input devices 110 and 118 may be compared to the threshold value, and the electronic devices having RSSI values exceeding the threshold value may be included in the subset. (For purposes of illustration, the subset may include input devices 110 and 118.) Then, electronic device 112 may provide pairing-intent information specifying the pairing intent to users of input devices 110 and 118. (In general, the pairing-intent information provided to the user of input device 110 may be different than the pairing-intent information provided to the user of input device 118.) After receiving the additional pairing-intent information from input devices 110 and 118, electronic device 112 may establish the BTLE connections with input devices 110 and 118 if the additional pairing-intent information matches the pairing-intent information.

Additionally, when electronic device 112 receives advertisements from a set of one or more hosts (such as electronic device 120) waiting to connect with input device 110, electronic device 112 may share that electronic device 112 is waiting to connect with input device 110 with electronic device 120. Moreover, electronic device 112 may provide the performance metric to electronic device 120, and may receive a performance metric (associated with the communication between input device 110 and electronic device 120) from electronic device 120. Using this information, electronic device 112 may identify a subset of the one or more hosts, such as electronic devices 112 and 120. For example, electronic device 112 may compare the performance metrics (such as RSSI values) to the threshold value. Then, electronic device 112 may provide pairing-intent information specifying the pairing intent to users of the set of one or more hosts, which these users may provide to the user of input device 110 to coordinate establishing BTLE connections. (Once again, the pairing-intent information provided to the users of the one or more hosts may be different or distinct from each other.) In addition, electronic device 112 may provide the pairing-intent information specifying the pairing intent to the user of input device 110 and, after receiving the additional pairing-intent information from input device 110, may establish the BTLE connection.

In these ways, the communication technique may simplify and coordinate establishing connections among input device 110, electronic device 112, input device 118 and/or electronic device 120. This may reduce user frustration and may improve the user experience when using electronic device 112.

In the described embodiments, processing a packet or frame in input device 110, electronic device 112, input device 118 and electronic device 120 includes: receiving wireless signals 116 with the packet or frame; decoding/extracting the packet or frame from received wireless signals 116 to acquire the packet or frame; and processing the packet or frame to determine information contained in the packet or frame (such as the additional pairing-intent information in the payload).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

Figure 2:
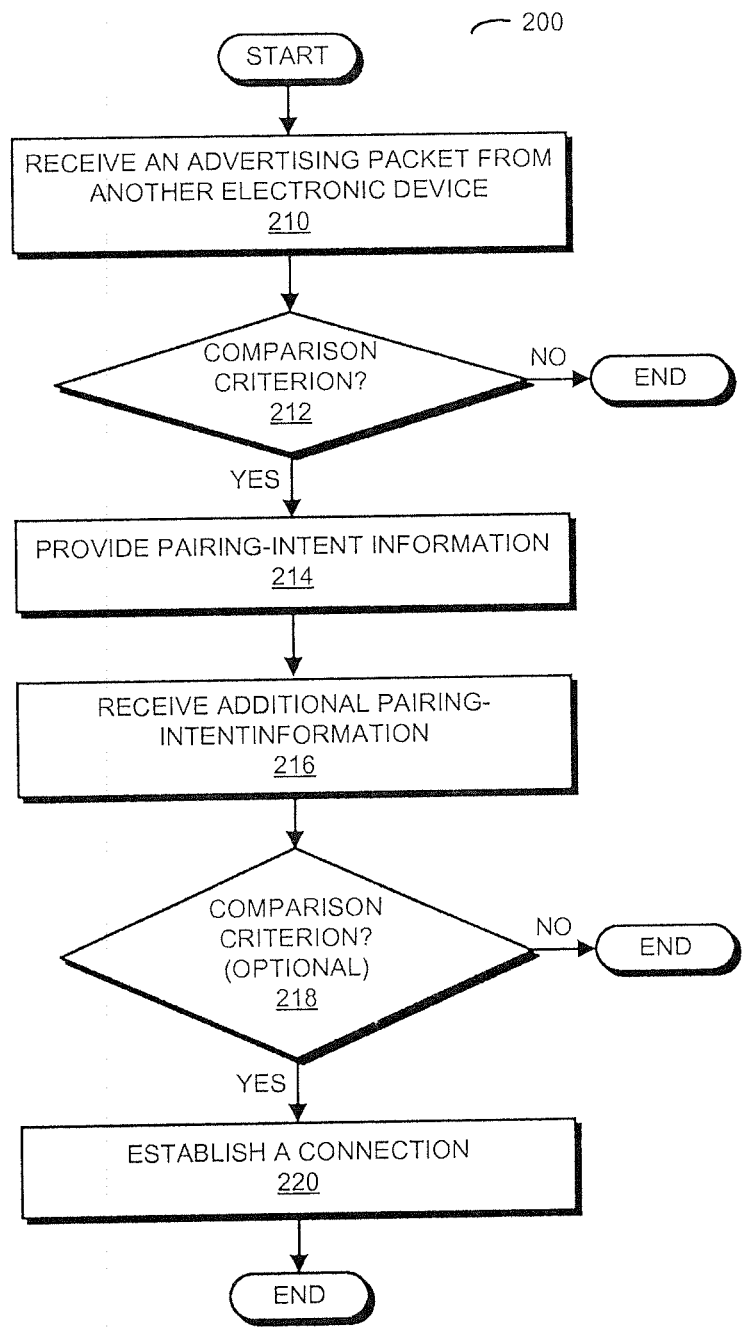
FIG. 2 is a method for establishing a connection between electronic devices in FIG. 1 in accordance with an embodiment of the present disclosure.

We now further describe the communication technique. FIG. 2 presents a method 200 for establishing a connection between electronic devices in FIG. 1 (such as input device 110 and electronic device 112), which may be performed by electronic device 112. During operation, the electronic device receives an advertising packet from another electronic device (operation 210).

Then, the electronic device compares a performance metric associated with communication with the other electronic device with a threshold value. If a comparison criterion is not achieved (operation 212), method 200 ends. For example, if the performance metric is less than the threshold value (or, depending on the performance metric used, greater than the threshold value), method 200 may end. Otherwise (operation 212), the electronic device provides pairing-intent information (operation 214) specifying a pairing intent for the electronic device and the other electronic device to a user of the other electronic device based on the comparison. For example, the other electronic device may present the pairing-intent information. Alternatively, the electronic device may display the pairing-intent information.

Next, the electronic device receives additional pairing-intent information (operation 216) specifying the pairing intent from the other electronic device.

Furthermore, the electronic device establishes a connection (operation 220) with the other electronic device when the additional pairing-intent information matches the pairing-intent information. In some embodiments, prior to establishing the connection (operation 220), the electronic device optionally compares the pairing-intent information and the additional pairing-intent information. If a comparison criterion is not achieved (operation 218), method 200 ends. For example, if a difference between the additional pairing-intent information and the pairing-intent information exceeds another threshold value (such as an average difference of 5 or 10% or a maximum difference of 5 or 10%), the connection may not be established. Otherwise (operation 218), the connection is established (operation 220).

In some embodiments, the electronic device performs one or more additional operations in method 200. For example, establishing the connection (operation 220) may involve: providing a command to the other electronic device to transition to a discovery mode when the additional pairing-intent information matches the pairing-intent information; receiving confirmation from the other electronic device that the other electronic device is in the discovery mode; and then establishing the connection.

Furthermore, the electronic device may: determine that a set of one or more additional electronic devices is waiting to connect with the other electronic device; share that the electronic device is waiting to connect with the other electronic device with the set of one or more additional electronic devices; provide the performance metric to the set of one or more additional electronic devices; and receive performance metrics from the set of one or more additional electronic devices.

Additionally, the electronic device may: receive advertising packets from a set of one or more additional electronic devices; compare performance metrics associated with the communication with the set of one or more additional electronic devices with the threshold value; identify at least a subset of the set of one or more additional electronic devices based on the comparisons; and repeat the providing of the pairing-intent information (operation 214), the receiving of the additional pairing-intent information (operation 216), and the establishing of the connection (operation 220) for the set of one or more additional electronic devices.

Figure 3:
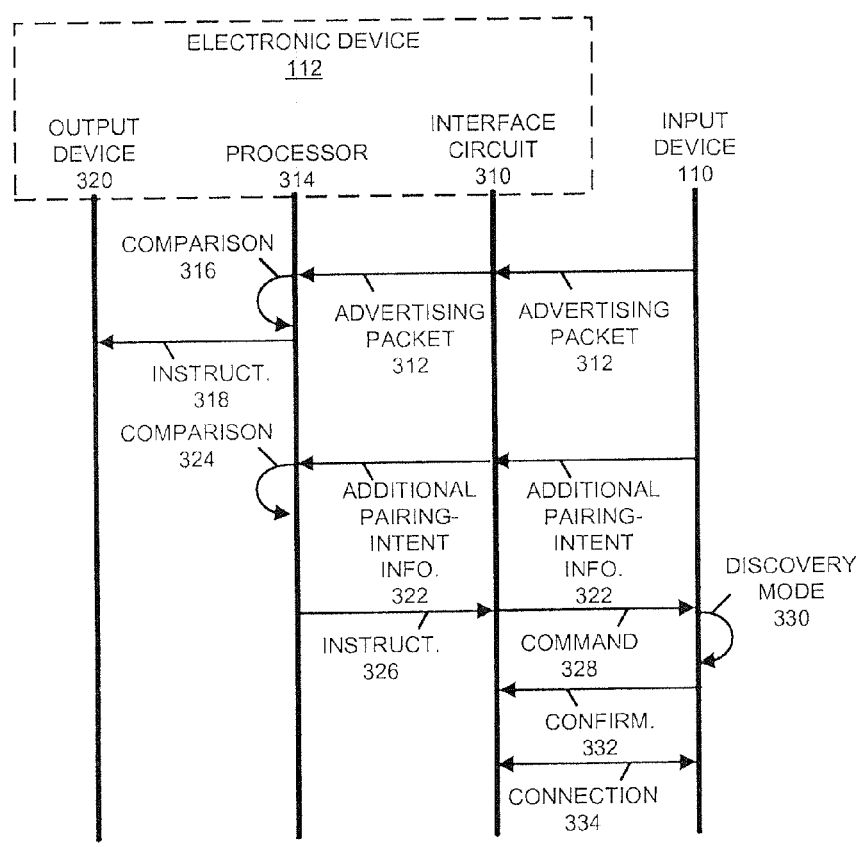
FIG. 3 is a drawing illustrating communication between the electronic devices of FIG. 1 in accordance with an embodiment of the present disclosure.

FIG. 3 presents a drawing illustrating communication between the electronic devices of FIG. 1. During method 200 (FIG. 2), input device 110 transmits and an interface circuit 310 in electronic device 112 receives an advertising packet 312. Then, a processor 314 compares 316 a performance metric associated with communication with input device 110 with a threshold value. If the performance metric exceeds the threshold value, processor 314 instructs 318 an output device 320 (such as a display or one or more speakers) to provide pairing-intent information specifying a pairing intent for input device 110 and electronic device 112 to a user of input device 110 based on comparison 316. Note that the pairing-intent information may be predefined or may be dynamically generated by electronic device 112. For example, a sequence of one or more characters may be generated using a random or a pseudorandom number generator.

Next, input device 110 provides additional pairing-intent information 322 specifying the pairing intent, which is received by interface circuit 310. Processor 314 compares 324 the pairing-intent information and additional pairing-intent information 322. If additional pairing-intent information 322 matches the pairing-intent information, processor 314 provides an instruction 326 to interface circuit 310. In response, interface circuit 310 provides a command 328 to input device 110 to transition to a discovery mode 330. Subsequently, input device 110 provides and interface circuit 310 receives a confirmation 332 that input device 110 is in discovery mode 330. Then, interface circuit 310 establishes a connection 334 with input device 110.

Note that at least some of the operations performed by processor 314 may be performed by interface circuit 310.

Figure 4:
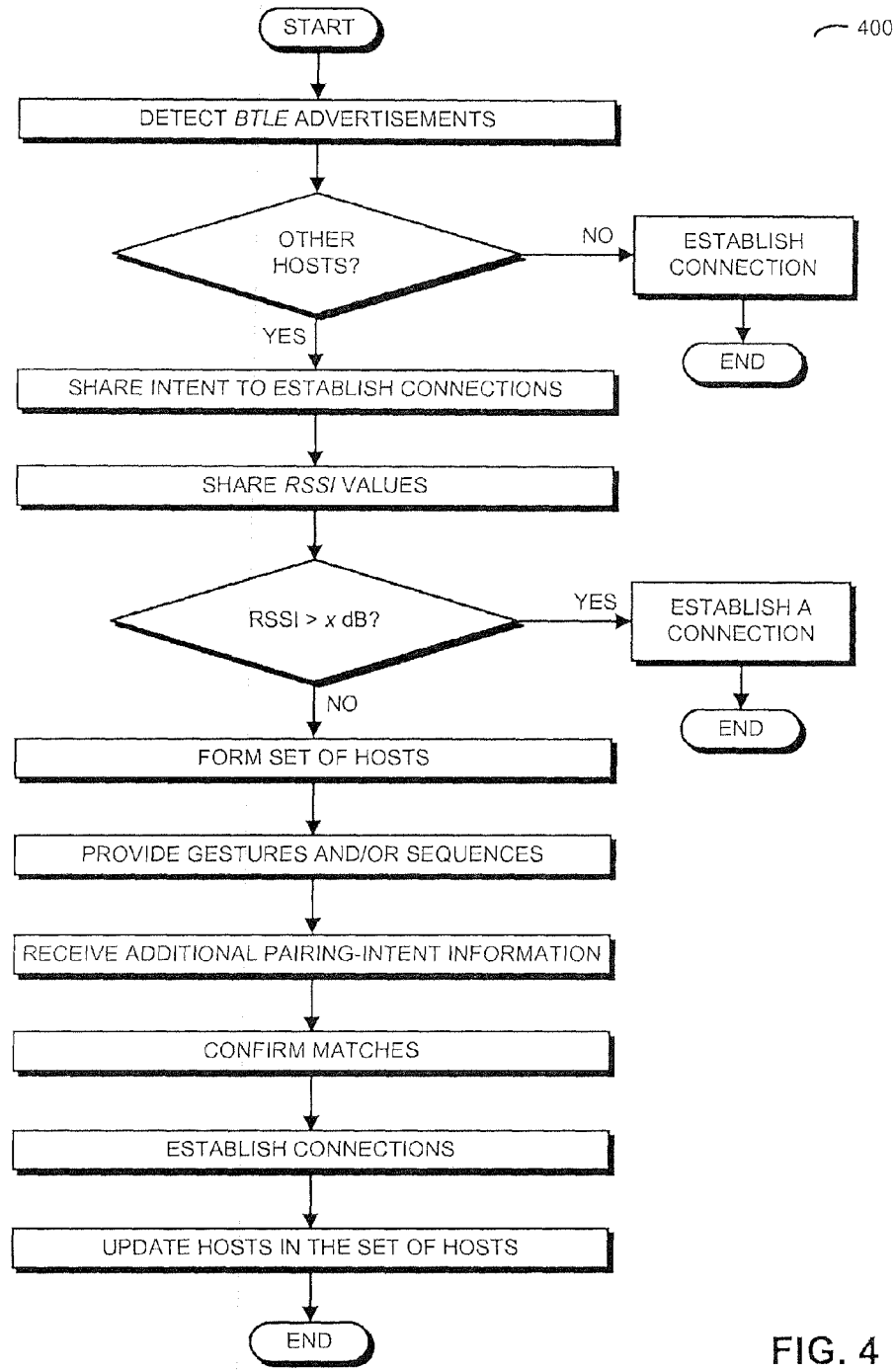
FIG. 4 is a method for establishing a connection between electronic devices in FIG. 1 in accordance with an embodiment of the present disclosure.

We now describe exemplary embodiments of the communication technique. FIG. 4 presents a method 400 for establishing a connection between electronic devices in FIG. 1, which may be performed by electronic device 112. In particular, if there are multiple hosts (such as electronic devices 112 and 120 in FIG. 1) and one input device (such as input device 110 in FIG. 1), electronic device 112 may detect the BTLE advertisements from input device 110. Then, if electronic device 112 detects other hosts (such as electronic device 120) waiting to connect with input device 110, electronic devices 112 and 120 may share their intent to establish connections or pair with input device 110. (Otherwise, electronic device 112 may pair with input device 110 using method 200 in FIG. 2.) In addition, electronic devices 112 and 120 may share performance metrics (such as RSSI values) associated with their respective communication with input device 110. Note that the hosts may share their intent to establish connections even if some of the hosts and/or the input device cannot communicate directly.

If one of the hosts has a measured RSSI greater than x dBm (such as 5-10 dBm) from the others (such as electronic device 112), then the connection may be established between input device 110 and electronic device 112. Otherwise, electronic device 112 may form a group or a set out of the hosts that have RSSI values within y dBm (such as −20 to −30 dBm) from the maximum RSSI value among the hosts (such as electronic devices 112 and 120). Note that the numerical values are provided as illustrations and are not intended to be limiting. In other embodiments, different numerical values may be used.

Next, for each of the hosts, electronic device 112 may generate a random sequence of one or more characters (such as alphanumeric characters) and/or a gesture, and electronic device 112 may share this pairing-intent information with the other hosts (such as electronic device 120).

In turn, each of the hosts may display the sequence and/or the gesture (and, more generally, may provide the pairing-intent information) to a user of input device 110 and request that the user of input device 110 match the pairing-intent information. In response, the user may enter the sequence and/or may perform the gesture using input device 110, which then transmits the additional pairing-intent information to the associated host. After receiving the additional pairing-intent information, the host may confirm that the additional pairing-intent information matches the pairing-intent information, and this host may pair or establish the connection with input device 110. Next, the host may alert or update the other hosts. This process may repeat with other hosts in the set of hosts, e.g., until all of the hosts in the set of hosts have paired or established connections with input device 110.

Figure 5:
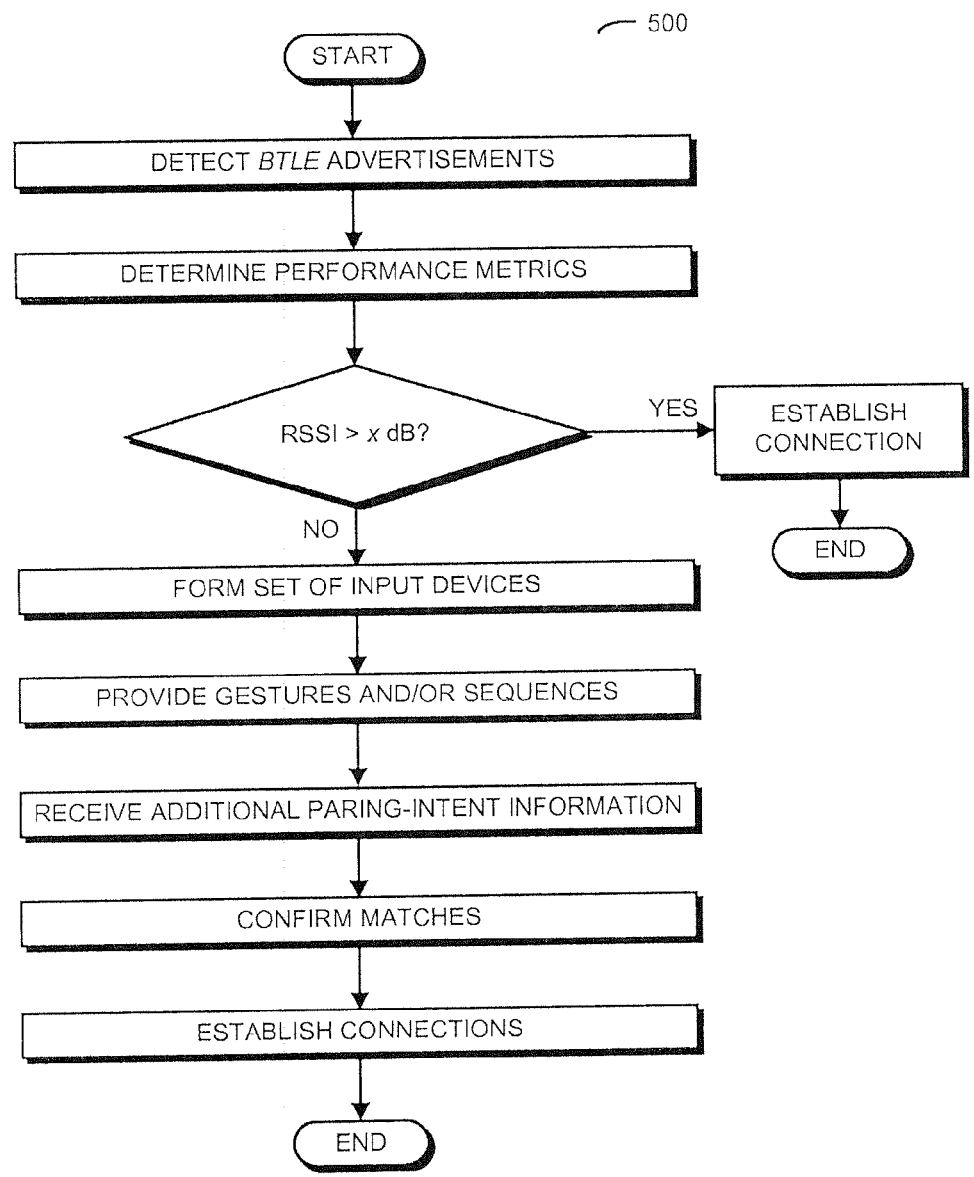
FIG. 5 is a method for establishing a connection between electronic devices in FIG. 1 in accordance with an embodiment of the present disclosure.

FIG. 5 presents a method 500 for establishing a connection between electronic devices in FIG. 1, which may be performed by electronic device 112. In particular, if there is one host (such as electronic device 112 in FIG. 1) and multiple input devices (such as input devices 110 and 118 in FIG. 1), electronic device 112 may detect the BTLE advertisements from input devices 110 and 118. Then, electronic device 112 determines performance metrics (such as RSSI values) associated with the communication with each of input devices 110 and 118.

If one of the input devices has a measured RSSI greater than x dBm (such as 5-10 dBm) from the others (such as input device 110), then the connection may be established between input device 110 and electronic device 112. Otherwise, electronic device 112 may form a group or a set out of the input devices that have RSSI values within y dBm (such as −20 to −30 dBm) from the maximum RSSI value among the input devices (such as input devices 110 and 118).

Next, for each of the input devices, electronic device 112 may generate a random sequence of one or more characters (such as alphanumeric characters) and/or a gesture, and electronic device 112 may provide this pairing-intent information to the users of the input devices (such as the users of input devices 110 and 118). For example, electronic device 112 may display the pairing-intent information and request that the users match it.

In response, the users of the input devices may enter the sequences and/or may perform the gestures using input devices 110 and 118, which then transmit the additional pairing-intent information to electronic device 112. After receiving the additional pairing-intent information, electronic device 112 may confirm that the additional pairing-intent information matches the pairing-intent information, and then electronic device 112 may pair or establish the connection with input devices 110 and 118.

Figure 6:
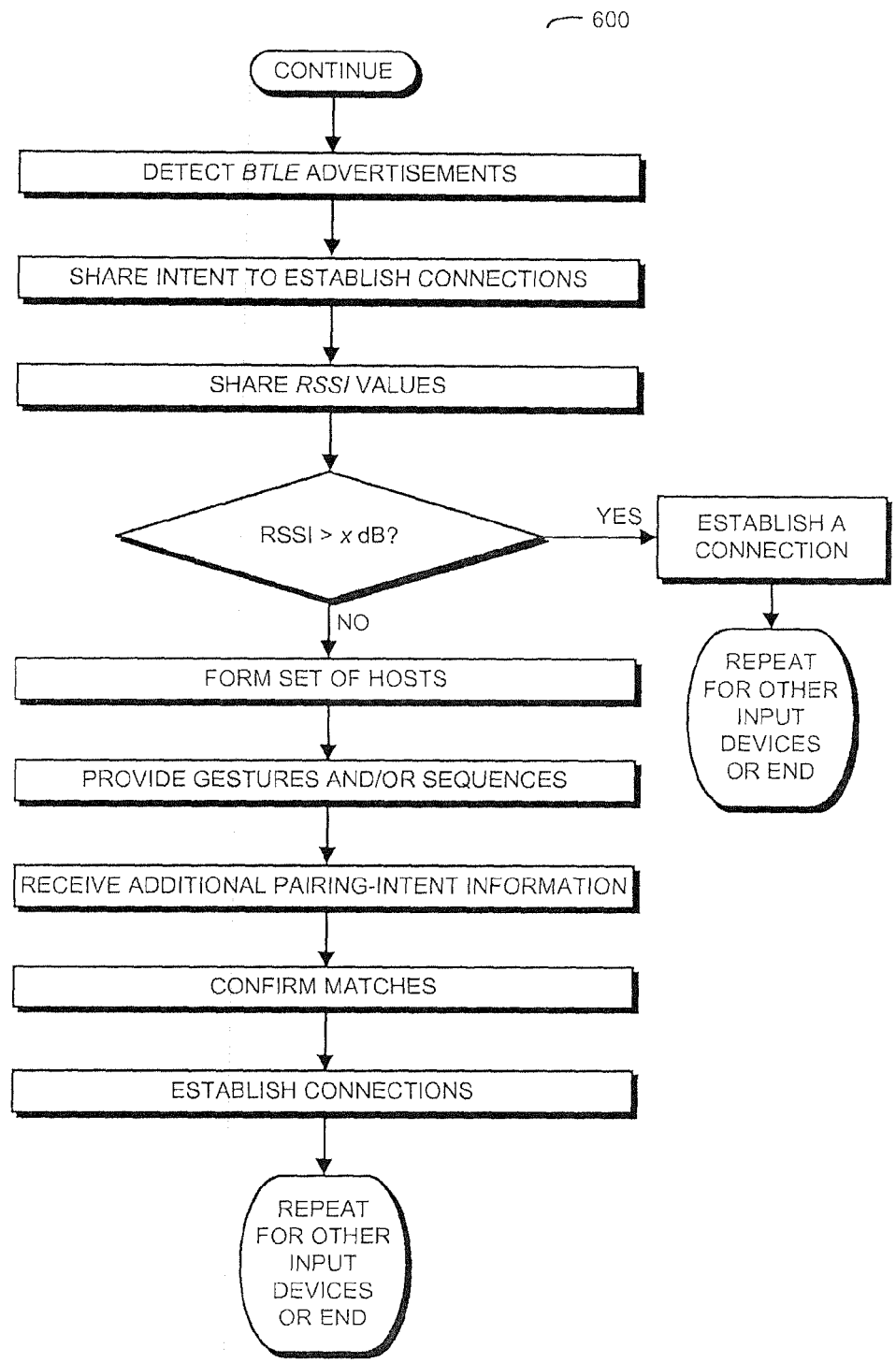
FIG. 6 is a method for establishing a connection between electronic devices in FIG. 1 in accordance with an embodiment of the present disclosure.

FIG. 6 presents a method 600 for establishing a connection between electronic devices in FIG. 1, which may be performed by electronic device 112. In particular, if there are multiple hosts (such as electronic devices 112 and 120 in FIG. 1) and multiple input devices (such as input devices 110 and 118 in FIG. 1), electronic device 112 may detect the BTLE advertisements from input devices 110 and 118. Then, electronic device 112 may share its intent to pair with one of the input devices (such as input device 110). In addition, electronic device determines a performance metric (such as an RSSI value) associated with the communication with input device 110, and shares this performance metric with the other hosts (such as electronic device 120). Note that the hosts may share their intent to establish connections even if some of the hosts and/or some of the input devices cannot communicate directly.

For each of the input devices (such as input device 110), if one of the hosts has a measured RSSI greater than x dBm (such as 5-10 dBm) from the others (such as electronic device 112), then the connection may be established between input device 110 and electronic device 112. Otherwise, electronic device 112 may form a group or a set out of the host devices that have RSSI values within y dBm (such as −20 to −30 dBm) from the maximum RSSI value among the hosts (such as electronic devices 112 and 120).

Next, for each of the hosts in the set, electronic device 112 may generate a random sequence of one or more characters (such as alphanumeric characters) and/or a gesture, and electronic device 112 may provide this pairing-intent information to the hosts in the set. Furthermore, each of the hosts may provide the pairing-intent information to user of input device 110. For example, electronic device 112 may display the pairing-intent information and request that the user match it.

In response, the user of input device 110 may enter the sequences and/or may perform the gestures using input device 110, which then transmits the additional pairing-intent information to the set of hosts. After receiving the additional pairing-intent information, a target host (such as electronic device 112) may confirm that the additional pairing-intent information matches the pairing-intent information, and then electronic device 112 may pair or establish the connection with input device 110.

These operations are repeated for each of the input devices (such as input device 118). Then, method 600 ends.

In some embodiments of the preceding methods, there may be additional or fewer operations. For example, if two or more of the gestures and/or sequences of one or more characters conflict with each other, electronic device 112 (FIG. 1) may provide new ones. Moreover, electronic device 112 (FIG. 1) may generate the gestures and/or sequences of one or more characters, or electronic device 112 (FIG. 1) may use predefined gestures and/or sequences of one or more characters. Furthermore, in some embodiments of the communication technique, the use of the performance metric is excluded. Additionally, the order of the operations may be changed, and/or two or more operations may be combined into a single operation. Note that a given gesture and/or a given sequence of one or more characters may have a timeout associated with it, so that it is only valid or can only be used to indicate an intent to establish a connection within a time window (such as 30 s, 1 min, 2 min or 5 min) after the given gesture and/or the given sequence of one or more characters is provided by electronic device 112 (FIG. 1).

In an exemplary embodiment, a Bluetooth trackpad or keyboard (and, more generally, an input device) may need to be paired with a host (a Bluetooth master) before use. Traditionally, Bluetooth pairing may require the slave device (such as the input device) to be in a discoverable or a discovery mode for the host to scan/inquire/page the slave and to pair with it. Moreover, this often requires the additional instructions be provided to the user as to how to set the slave device to the discovery mode.

In the communication technique, a gesture or a sequence of one or more characters is combined with BTLE RSSI to establish the pairing. This communication technique may not require the user to activate the discovery mode before the pairing.

During the communication technique, the slave device may transmit a BTLE advertisement with its identification information, including: a vendor identifier (VID), a product identifier (PID), Bluetooth address, etc. If the host receives the BTLE advertisement and identifies it as the specific input device via VID and/or RID, the host may check that there is only one host and only one slave device, and that the slave device is within a predefined range (e.g., based on the RSSI). If both conditions are satisfied, the host may send a signal to the input device and may process the pairing automatically (e.g., without additional user action).

However, when there are multiple hosts and/or slave devices within a predefined range, the hosts may communicate with each other and share the range to each slave device. One or more of the hosts may process the range information from itself and the other hosts, and may determine if only one master/slave device satisfies the range condition. Then, the one or more hosts may share this range information with the other masters.

If one master/slave device combination is not found, the one or more hosts may generate a gesture and/or a sequence of characters and ask the corresponding slave device to match it. This gesture and/or sequence of characters may serve the function of picking the correct slave device and pairing password. Note that, if any master/slave device combination pairs, this master may update the other hosts to avoid mis-pairing.

In some embodiments, the host uses the gesture and/or the sequence of characters to identify which slave devices to pair with without checking the range of the slave devices. Moreover, the gesture and/or a sequence of characters may serve as the password when the master and the slave device pair. Furthermore, the hosts may mutually share their pairing-intent information and the pairing-intent information for the slave device for pairing. Additionally, if any host successfully pairs with one of the slave devices, it may update the other hosts.

We now describe embodiments of the electronic device. FIG. 7 presents a block diagram illustrating an electronic device 700, such as electronic device 112 in FIG. 1. This electronic device includes processing subsystem 710, memory subsystem 712, and networking subsystem 714. Processing subsystem 710 includes one or more devices configured to perform computational operations. For example, processing subsystem 710 can include one or more microprocessors, application-specific integrated circuits (ASICs), microcontrollers, programmable-logic devices, and/or one or more digital signal processors (DSPs).

Memory subsystem 712 includes one or more devices for storing data and/or instructions for processing subsystem 710 and networking subsystem 714. For example, memory subsystem 712 can include dynamic random access memory (DRAM), static random access memory (SRAM), and/or other types of memory. In some embodiments, instructions for processing subsystem 710 in memory subsystem 712 include: one or more program modules or sets of instructions (such as program module 722 or operating system 724), which may be executed by processing subsystem 710. Note that the one or more computer programs may constitute a computer-program mechanism. Moreover, instructions in the various modules in memory subsystem 712 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 710.

In addition, memory subsystem 712 can include mechanisms for controlling access to the memory. In some embodiments, memory subsystem 712 includes a memory hierarchy that comprises one or more caches coupled to a memory in electronic device 700. In some of these embodiments, one or more of the caches is located in processing subsystem 710.

In some embodiments, memory subsystem 712 is coupled to one or more high-capacity mass-storage devices (not shown). For example, memory subsystem 712 can be coupled to a magnetic or optical drive, a solid-state drive, or another type of mass-storage device. In these embodiments, memory subsystem 712 can be used by electronic device 700 as fast-access storage for often-used data, while the mass-storage device is used to store less frequently used data.

Networking subsystem 714 includes one or more devices configured to couple to and communicate on a wired and/or wireless network (i.e., to perform network operations), including: control logic 716, an interface circuit 718 and one or more antennas 720. For example, networking subsystem 714 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 714 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 700 may use the mechanisms in networking subsystem 714 for performing simple wireless communication between the electronic devices, e.g., transmitting advertising or beacon frames and/or scanning for advertising frames transmitted by other electronic devices as described previously.

Within electronic device 700, processing subsystem 710, memory subsystem 712, and networking subsystem 714 are coupled together using bus 728. Bus 728 may include an electrical, optical, and/or electro-optical connection that the subsystems can use to communicate commands and data among one another. Although only one bus 728 is shown for clarity, different embodiments can include a different number or configuration of electrical, optical, and/or electro-optical connections among the subsystems.

In some embodiments, electronic device 700 includes a display subsystem 726 for displaying information on a display, which may include a display driver and the display, such as a liquid-crystal display, a multi-touch touchscreen, etc.

Electronic device 700 can be (or can be included in) any electronic device with at least one network interface. For example, electronic device 700 can be (or can be included in): a desktop computer, a laptop computer, a server, a media player (such as an MP3 player), an appliance, a subnotebook/netbook, a tablet computer, a smartphone, a cellular telephone, an input device (such as a wireless keyboard, a wireless touchpad, a peripheral device, etc.), a piece of testing equipment, a network appliance, a set-top box, a personal digital assistant (FDA), a toy, a controller, a digital signal processor, a game console, a computational engine within an appliance, a consumer-electronic device, a portable computing device, a personal organizer, a sensor, a user-interface device and/or another electronic device.

Although specific components are used to describe electronic device 700, in alternative embodiments, different components and/or subsystems may be present in electronic device 700. For example, electronic device 700 may include one or more additional processing subsystems 710, memory subsystems 712, networking subsystems 714, and/or display subsystems 726. Additionally, one or more of the subsystems may not be present in electronic device 700. Moreover, in some embodiments, electronic device 700 may include one or more additional subsystems that are not shown in FIG. 7. For example, electronic device 700 can include, but is not limited to, a data collection subsystem, an audio and/or video subsystem, an alarm subsystem, a media processing subsystem, and/or an input/output (I/O) subsystem. Also, although separate subsystems are shown in FIG. 7, in some embodiments, some or all of a given subsystem or component can be integrated into one or more of the other subsystems or component(s) in electronic device 700. For example, in some embodiments program module 722 is included in operating system 724.

Moreover, the circuits and components in electronic device 700 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 714, such as a radio. Moreover, the integrated circuit may include hardware and/or software mechanisms that are used for transmitting wireless signals from electronic device 700 and receiving signals at electronic device 700 from other electronic devices. Aside from the mechanisms herein described, radios are generally known in the art and hence are not described in detail. In general, networking subsystem 714 and/or the integrated circuit can include any number of radios. Note that the radios in multiple-radio embodiments function in a similar way to the described single-radio embodiments.

In some embodiments, networking subsystem 714 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While a communication protocol compatible with the Bluetooth Low Energy standard was used as an illustrative example, the described embodiments of the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the detection technique may be implemented using program module 722, operating system 724 (such as a driver for interface circuit 718), or in firmware in interface circuit 718. Alternatively or additionally, at least some of the operations in the detection technique may be implemented in a physical layer, such as hardware in interface circuit 718.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A first electronic device, comprising:
one or more processors;
a memory communicatively coupled to the one or more processors, wherein the one or more processors are configured to:
transmit an advertising packet;
receive input corresponding to at least a password, the password having been generated by a second electronic device after receipt of the advertising packet, the password enabling pairing between the first electronic device and the second electronic device; and
transmit a message comprising the password to the second electronic device, wherein the second electronic device is within a predefined range of the first electronic device.

2. The first electronic device of claim 1, wherein the one or more processors are further configured to:
receive a command from the second electronic device to transition to a discovery mode;
transition to the discovery mode; and
transmit a confirmation to the second electronic device that the first electronic device is in the discovery mode.

3. The first electronic device of claim 1, wherein the predefined range is based at least in part on a received signal strength indicator (RSSI) associated with the advertising packet.

4. The first electronic device of claim 1, wherein the password comprises at least one of: a gesture or a sequence of one or more characters.

5. The first electronic device of claim 4, wherein the message comprises at least one of:
the sequence of one or more characters;
accelerometer data corresponding to the gesture;
output from a touch-sensitive display;
output from an orientation sensor;
output from a keyboard;

output from speakers using a voice-recognition technique; or user-interface data corresponding to the gesture.

6. The first electronic device of claim 1, wherein the advertising packet comprises at least one of:
   a vendor identifier (VID);
   a product identifier (PID); or
   an address.

7. The first electronic device of claim 1, wherein the transmit the advertising packet and the transmit the message each occurs via a wireless network interface comprising at least one of:
   a Bluetooth® interface;
   a cellular network interface; or
   a wireless local access network interface.

8. The first electronic device of claim 1, wherein the one or more processors are further configured to present the password.

9. The first electronic device of claim 1, wherein the password was generated dynamically by the second electronic device using a random or a pseudorandom number generator, and wherein the password is displayed on the second electronic device.

10. The first electronic device of claim 1, wherein to receive the input, the one or more processors are configured to: capture measurements associated with the password via an accelerometer.

11. A method for a first electronic device, comprising:
    transmitting an advertising packet;
    receiving input corresponding to at least a password, the password having been generated by a second electronic device after receipt of the advertising packet, the password enabling paring between the first electronic device and the second electronic device; and
    transmitting a message comprising the password to the second electronic device.

12. The method of claim 11, further comprising:
    receiving a command from the second electronic device to transition to a discovery mode;
    transitioning to the discovery mode; and
    transmitting a confirmation to the second electronic device that the first electronic device is in the discovery mode.

13. The method of claim 11, wherein the password is associated with a received signal strength indicator (RSSI) corresponding to the advertising packet received by the second electronic device.

14. The method of claim 11, wherein the password comprises at least one of:
    a gesture or a sequence of one or more characters.

15. The method of claim 14, wherein the message comprises at least one of:
    the sequence of one or more characters;
    accelerometer data corresponding to the gesture;
    output from a touch-sensitive display;
    output from an orientation sensor;
    output from a keyboard;
    output from speakers using a voice-recognition technique; or
    user-interface data corresponding to the gesture.

16. The method of claim 11, wherein the advertising packet comprises at least one of:
    a vendor identifier (VID);
    a product identifier (PID); or
    an address.

17. A non-transitory computer-readable medium having instructions stored therein, which when executed by a processor in a first electronic device cause the processor to perform operations, the operations comprising:
    transmitting an advertising packet;
    receiving input corresponding to at least a password, the password having been generated by a second electronic device after receipt of the advertising packet, the password enabling pairing between the first electronic device, and the second electronic device; and
    transmitting a message comprising the password to the second electronic device, wherein the password is associated with a received signal strength indicator (RSSI) corresponding to the advertising packet received by the second electronic device.

18. The non-transitory computer-readable medium of claim 17, the operations further comprising:
    receiving a command from the second electronic device to transition to a discovery mode;
    transitioning to the discovery mode; and
    transmitting a confirmation to the second electronic device that the first electronic device is in the discovery mode.

19. The non-transitory computer-readable medium of claim 17, wherein the password comprises at least one of:
    a gesture or a sequence of one or more characters.

20. The non-transitory computer-readable medium of claim 19, wherein the message comprises at least one of:
    the sequence of one or more characters;
    accelerometer data corresponding to the gesture;
    output from a touch-sensitive display;
    output from an orientation sensor;
    output from a keyboard;
    output from speakers using a voice-recognition technique; or
    user-interface data corresponding to the gesture.

* * * * *